United States Patent [19]
Stragnola

[11] Patent Number: 5,983,564
[45] Date of Patent: Nov. 16, 1999

[54] HYDROPONIC GROWING STATION WITH INTEGRATED WATERING SUPPLY

[76] Inventor: Steven Vincent Stragnola, 23 Dutch Valley La., San Anselmo, Calif. 94960

[21] Appl. No.: 09/128,039

[22] Filed: Aug. 3, 1998

[51] Int. Cl.[6] .......................... A01G 31/00; A01G 25/00; A01G 9/00
[52] U.S. Cl. .................... 47/62 R; 47/79; 47/18
[58] Field of Search ............... 47/59, 62 R, 18, 47/65.5, 79

[56] References Cited

U.S. PATENT DOCUMENTS

| 606,842 | 7/1898 | Miller | 47/18 |
|---|---|---|---|
| 3,992,809 | 11/1976 | Chew | 47/62 R |
| 4,106,235 | 8/1978 | Smith | 47/59 |
| 4,166,341 | 9/1979 | Vestergaard | 47/59 |
| 4,170,844 | 10/1979 | Steele | 47/62 R |
| 4,248,013 | 2/1981 | Allen | 47/59 |
| 4,521,989 | 6/1985 | Meyer | 47/14 |
| 4,901,471 | 2/1990 | Van Der Top | 47/1.1 |
| 4,930,253 | 6/1990 | Todd, Sr. | 47/65 |
| 4,982,527 | 1/1991 | Sprung | 47/59 |
| 5,025,589 | 6/1991 | Park | 47/61 |
| 5,179,800 | 1/1993 | Hunag | 47/73 |
| 5,247,762 | 9/1993 | Green | 47/79 |
| 5,252,108 | 10/1993 | Banks | 47/58 |
| 5,400,544 | 3/1995 | Wien | 47/33 |
| 5,425,198 | 6/1995 | Coy | 47/18 |
| 5,440,836 | 8/1995 | Lee | 47/60 |
| 5,507,116 | 4/1996 | Gao | 47/18 |
| 5,673,511 | 10/1997 | Holtkamp | 47/18 |
| 5,782,035 | 7/1998 | Locke et al. | 47/79 |

FOREIGN PATENT DOCUMENTS

| 4004154 | 8/1991 | Germany | 47/18 |
|---|---|---|---|
| 40/5049350 | 3/1993 | Japan | 47/18 |
| 40/5137470 | 6/1993 | Japan | 47/18 R |
| 40/6133656 | 5/1994 | Japan | 47/59 |
| 2273233 | 6/1994 | United Kingdom | 47/48.5 |
| WO 81/01495 | 6/1981 | WIPO | 47/18 |
| WO 82/02642 | 8/1982 | WIPO | 47/59 |
| WO 90/07871 | 7/1990 | WIPO | 47/18 |

OTHER PUBLICATIONS

Florida Cooperative Extension Service, Vegetable Crops Fact Sheet, p. 3, Jul. 1980.

*Primary Examiner*—Thomas Price
*Assistant Examiner*—Fredrick T. French, III
*Attorney, Agent, or Firm*—Leland K. Jordan

[57] ABSTRACT

A growing station having a growing tray on a watering bench, the tray adapted to expose a pumping compartment within the lowermost portion of the watering bench, the tray also adapted to filter and collect water that has been sprayed thereon.

16 Claims, 3 Drawing Sheets

HYDROPONIC GROWING STATION WITH INTEGRATED WATERING SUPPLY

FIELD OF THE INVENTION

This invention relates generally to a hydroponic growing station, and more particularly to a modular watering bench with vertically disposed back and sides each having inwardly extending ledge portions that serve to slideably support a plant growing tray so that in an open position, a water pumping compartment in the lowermost portion of the growing station is readily accessible. Water sprayed onto the plant growing tray is collected and filtered before being delivered to the water pumping compartment.

BACKGROUND OF THE INVENTION

Indoor cultivation of fruits, vegetables, flowers and ornamental plants is an increasingly popular method of producing living plants, whether for the horticulturist, hobbyist or professional nursery operator. In some operations, seeds are planted in flat, plant growing trays and these trays are exposed to light and watering conditions optimized for growth. Typically, these planting trays are arrayed in an open area and watered using a large spraying system which is adapted to provide fairly uniform watering over the entire open area. This introduces two factors of concern, the first being wastage of water sprayed between trays and typically not recovered, the second being maintaining operation of a large water pumping system so that optimum watering conditions are maintained. Another factor is providing different watering conditions that are optimized to meet the requirements of different plants.

U.S. Pat. No. 5,673,511 describes a self-watering tray for supporting and displaying a plurality of potted plants which can be watered from a water reservoir in the bottom of the tray, the tray comprising a plurality of wall sections which define spaced openings in the tray, each wall section being provided with a support located above the reservoir for supporting the potted plant at or above the water, and being laterally open to the adjacent wall sections below the supports to provide a continuous reservoir channel below the supports and pots, through which water can circulate for watering plants by capillary action.

U.S. Pat. No. 5,425,198 discloses a device for automatically watering potted type plants has a shallow reservoir base/tray capable of holding water and also capable of supporting at least one previously potted plant and also capable of supporting an inverted container, such as a typical screw top jar turned upside down, for containing additional water and/or other plant nutrients. A specially adapted support base is used to keep the bottom of the inverted container where the opening is located slightly above the bottom of the base/tray. The base/tray can have ribs or rails to keep the potted plant raised slightly above the lowest part of the tray but lower than the opening in the inverted container. The water container has a detachable lid with a hole. The detachable lid is attached to the water filled container not yet inverted and the lid and container are fixed to the base/tray while the hole is covered by the plant owner's finger creating a partial vacuum in the water container such that water will only flow from the water container when the water level in the tray/base drops below the level of the inverted container opening.

U.S. Pat. No. 5,247,762 claims a controlled release hydraulic watering system for either an individual plant pot or for a plurality of potted plants. The system utilizes a porous terra cotta water-receiving reservoir which, through permeation, can distribute water either into an individual potted plant at a controlled release rate without overwatering the plant contained therein or onto a capillary sheet and horticultural matting used in an irrigating tray containing a plurality of potted plants providing a proper amount of water to the tray for watering all the plants contained therein. The terra cotta reservoir may include an exterior side wall covering of horticultural matting, silica sand and a plastic sheet.

U.S. Pat. No. 5,179,800 entails a plant growing tray system which includes a tray with a plurality of individual plant cells having an open top and bottom and a detachable screen or perforated bottom. Each tray cell is designed to contain and hold a plant growing medium such as peat cake or peat-soil mix. A detachable bottom secured to the bottom part of the plant tray provides air pruning of plant roots and can be conveniently removed from the plant tray for easy removal of the individual plants or seedlings from the tray bottom. Air-pruning of plant roots eliminates root binding or tangling and accelerates root branching resulting in enhanced plant growth in the cell or after transplanting. The plant tray has a surrounding edge to hold a water level above the top of the tray cell or micro-feeding holes of each cell for self watering and to maintain uniform root zone temperature throughout the tray. The detachable screen or perforated bottom can be press fitted to the tray bottom to hold the peat mix and to provide effective air-pruning of the plant roots.

U.S. Pat. No. 4,106,235 discloses a portable planter for house plants comprising an upper plant holder means received in a lower vessel containing water for the plant such that the lower vessel is effectively closed to prevent loss of water vapor, the water level being below the bottom of the plant holder means, the bottom of said plant holder means including a support means comprising crossing reinforcing ribs supporting a removable aluminum window screen, said bottom being at least 34% open and holding fine particulate plant-supporting material at least directly on said screen and accommodating a substantial root system, said screen having openings at least $1/36$ inch and smaller than about 150 inch in the largest dimensions.

SUMMARY OF THE INVENTION

In view of the foregoing, it is believed to be advantageous to provide a hydroponic plant growing station comprising a modular watering bench with vertically disposed back and sides each having inwardly extending ledge portions that serve to slideably support a planting tray containing a plant growing medium so that in an open position, a water pumping compartment in the lowermost portion of the watering bench is readily accessible. The water pumping compartment is adapted to contain a supply of water and a submersible water pump suitable for pumping water from the water pumping compartment to a spraying mechanism positioned above the watering bench. In this manner, watering conditions may be optimized for single trays of differing seeds or plants.

Another feature of the invention is the provision of a planting tray having a water collection shell positioned below the plant growing medium so that water passed through the growing medium may be collected and returned to the water pumping compartment of the growing station.

The planting tray is preferably adapted with a filtering portion so that water passed through the growing medium may be filtered to remove debris or the like before being returned to the pumping compartment and recycled by pumping to the spraying mechanism.

In an exemplary embodiment of the present invention, the side walls of the watering bench have a rolled top edge to facilitate handling of the growing station by an operator.

These and other features of the invention are attained by providing a substantially rectangular drawer which defines a planting tray having upstanding front, rear and side edges and a substantially flat bottom having a pair of water passage ports therein. The first passage port allows water to be pumped from a pump located in the water pumping compartment to a water spraying mechanism positioned above the watering bench. The second passage port allows water that has passed through the growing medium to be returned to the pumping compartment.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE PREFERRED EMBODIMENTS

Figure 1:
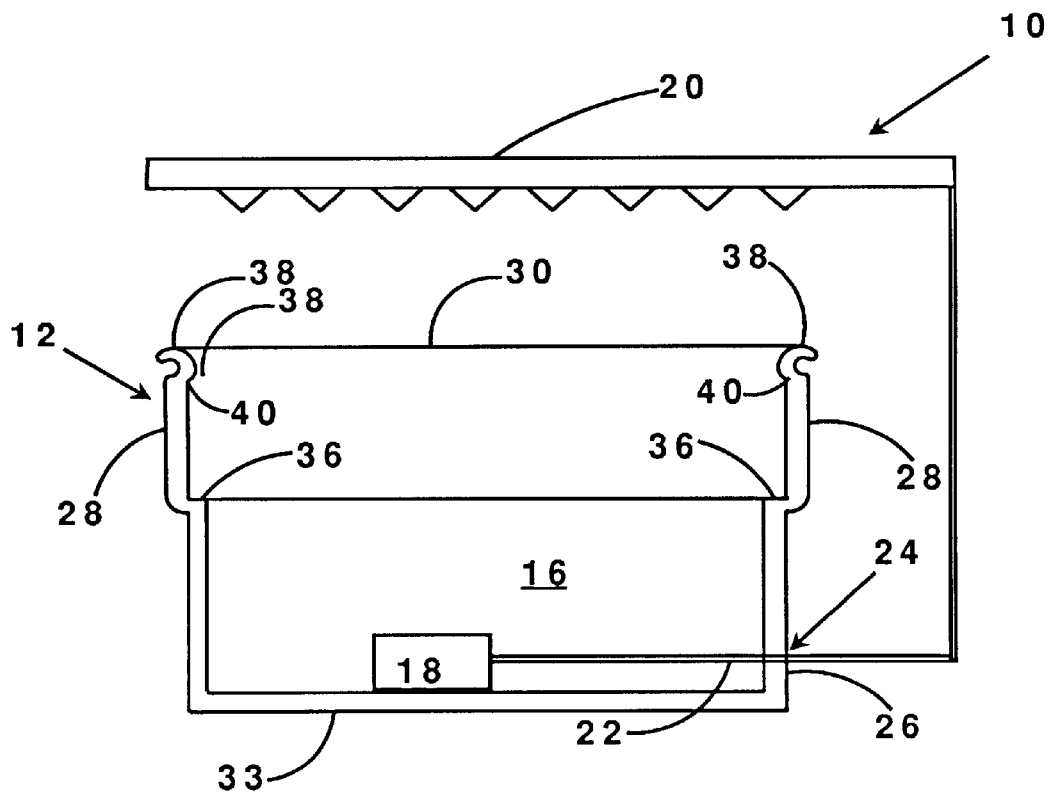
FIG. 1 is a vertical cross-section of a plant growing station in accordance with the present invention.

FIG. 1 shows a plant growing station 10 constructed in accordance with the present invention and comprising a watering bench 12 adapted to support a planting tray 14 (seen in FIGS. 3, 4, and 5) and having a water pumping compartment 16 in its lowermost portion. A water pump 18 is disposed in the lowermost portion of the watering bench 12 and is connected to a spraying mechanism 20 using a tube 22 which passes through an externally sealed port 24 in a lower side wall 26 of the watering bench 12. Alternately, tube 22 may pass through a port 25 in the planting tray 14 (FIG. 5). Water pump 18 is preferable a submersible pump capable of pumping quantities of water in the 0.5 to 2 gallons/min. range at low pressures and operating on 12-volts DC for safety considerations. Such pumps are commonly available as marine bilge pumps, for instance and may be obtained from Aquatic Eco-Systems, Apoka, Fla.

Figure 2:
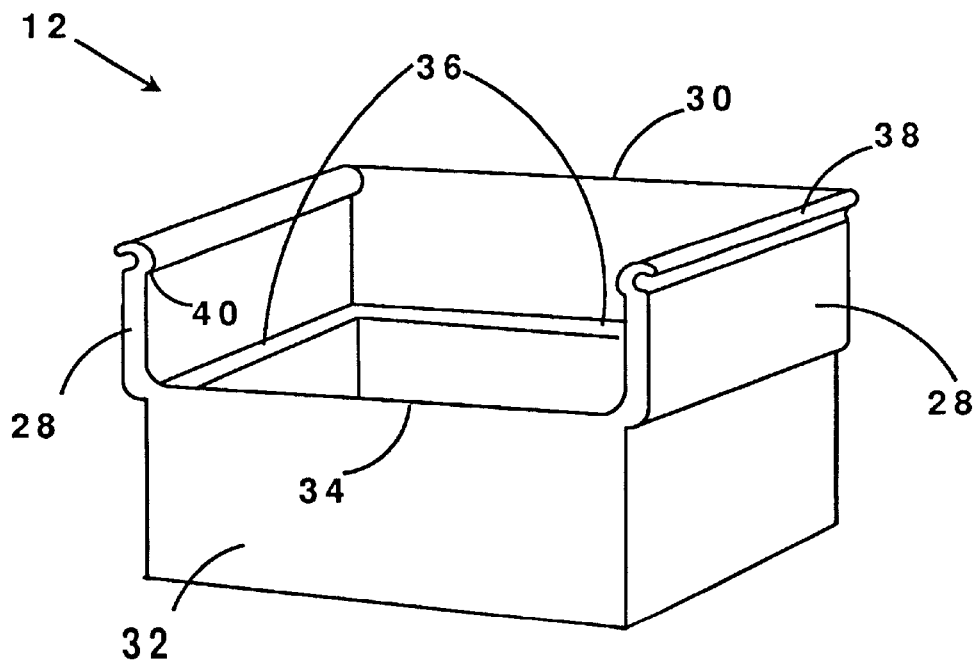
FIG. 2 is a perspective view of the storage bench of FIG. 1.

As seen in FIG. 2, the watering bench 12 is constructed from a pair of opposing upstanding side walls 28 and an upstanding rear wall 30 therebetween. An upstanding front wall 32 is located opposite the rear wall and is integral with side walls 28 so as to create a box-like watering bench 12. A solid bottom 33 is formed across the lowermost edges of the walls so form a leak-free water pumping compartment 16 in the lowermost portion of the watering bench 12. The uppermost portions of back wall 30 and side walls 28 are offset outwardly from the lowermost portions of back wall 30 and side walls 28 near the middle height of the back wall 30 and side walls 28 at a position equal to the height of the uppermost edge 34 of the front wall to provide rectangular support ledges 36 suitable for supporting tray 14 in a horizontal position above the pumping compartment 16. In a preferred embodiment, the back wall 30 and side walls 28 are of height about 11 inches and the front wall 32 is of height about 6 inches. The opening formed by the uppermost edge 34 of front wall 32 in cooperation with back wall 30 and side walls 28 is generally in the range 21×21 inches so that the ledges 36 are able to support tray 14 even when tray 14 is in a partially opened position described hereinafter.

Each of the side walls 28 has an upper end thereof folded back on itself to define a rolled top edge 38 and an inverted shoulder 40. The side walls 28 are dimensioned vertically relative to the uppermost edge 34 of front wall 32 so that the inverted shoulder 40 acts to maintain tray 14 securely when the tray 14 is inserted into the bench 12 and supported by ledges 36. It will be appreciated that the rolled top edge 38 facilitates grasping by an operator to move the watering bench 12.

Figure 3:
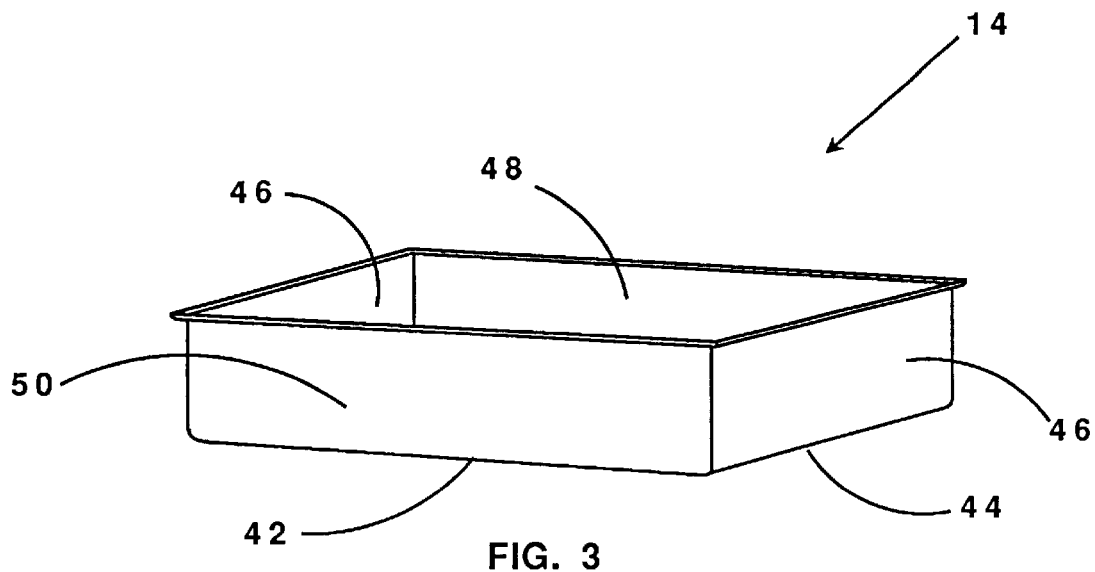
FIG. 3 is perspective view of a planting tray used in conjunction with the storage bench of FIG. 1.

The planting tray 14 useful in the present invention is of the type shown in FIG. 3 and is generally of a size about 20×20 inches. The tray 14 typically has a flat, rectangular bottom 42 integral at the opposite side edges 44 thereof with upstanding side walls 46, an upstanding rear wall 48 and an upstanding front wall 50. Tray 14 is designed to accommodate a variety of seeds or plants embedded in an inert growing medium 49 contained in tray 14. The inert growing medium 49 typically includes clay pellets, sand, gravel, perlite, vermiculite, or the like. Preferably, the walls 46, 48 and 50 are integral at the upper edges thereof with a outwardly projecting flange 52. It will be appreciated that the flange 52 facilitates grasping by an operator to remove the tray 14 from the watering bench 12 for such operations as replacing plant growing medium 49 contained in the tray 14, replanting seeds and plants, and the like.

Figure 4:
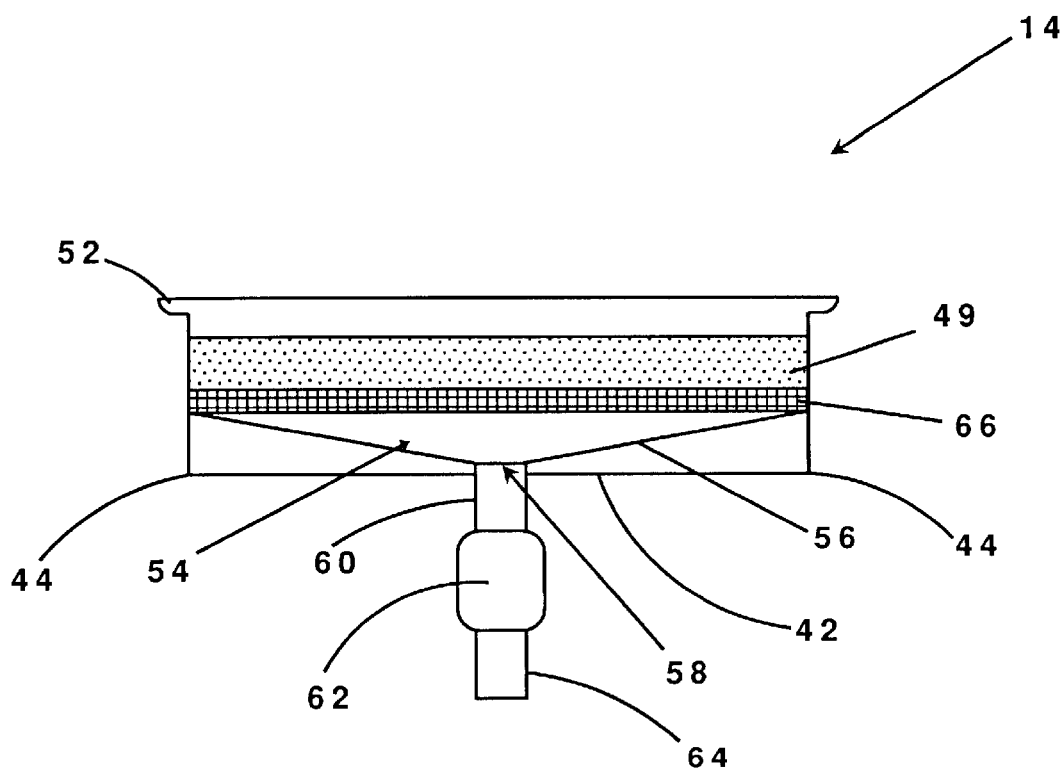
FIG. 4 is a vertical cross-section of the planting tray of FIG. 3.
Figure 5:
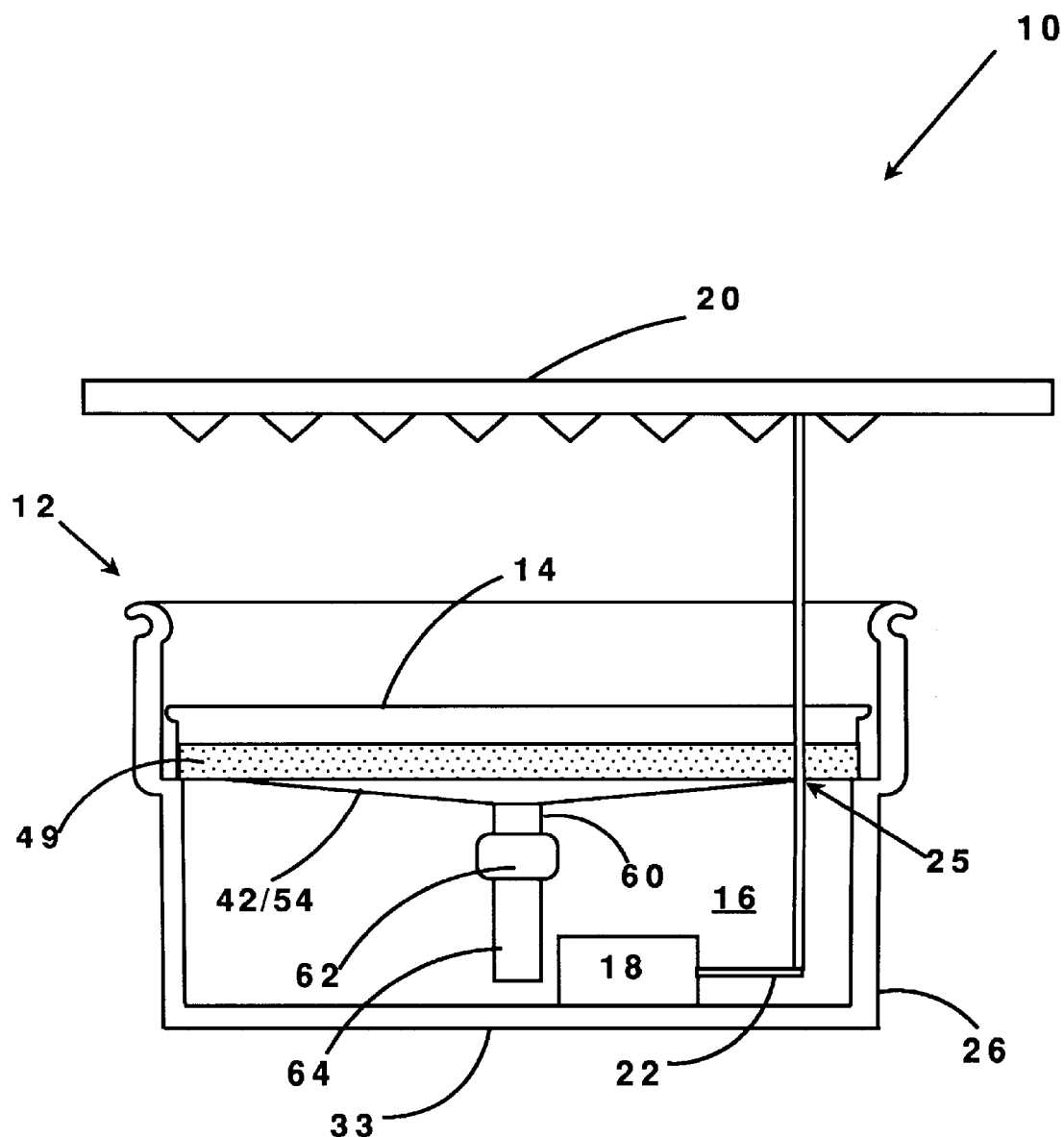
FIG. 5 is a vertical cross-section of an alternate embodiment of the plant growing station of FIG. 1 in accordance with the present invention.

As seen in FIG. 4, tray 14 preferably also comprises a removable water collecting shell 54 that is coextensive with and adjacent to the rectangular bottom 42 of the tray 14. The collecting shell 54 is shaped with a central portion 56 which slopes downward from its outermost edges to facilitate collection of water that has passed through growing medium 49 disposed in the planting tray 14 and above the collecting shell 54. An open water passage port 58 is located in the central portion 56 and is connected by a tube 60 or equivalent to a water filter 62 which has an output tube 64 that delivers filtered water into the pumping compartment 16. Suitable water filters 62 include stainless steel wedge wire screen cartridge types obtainable from the Everfilt Corporation, Mira Loma, Calif., and spun polypropylene or pleated polyester in-ine filters available from PlumbingMart, Chico, Calif.

Water from the spraying mechanism 20 that has been sprayed on seeds or plants in the growing medium 49 and that has passed through growing medium 49 and through the filter 62 may be returned to the pumping compartment 16 and recycled by the pump 18 back again to the spraying mechanism 20. The particular nature of the spraying mechanism 20 is not critical to the present invention, such spraying mechanisms 20 including mist, droplet and higher-pressure forced direct spray designs.

In an alternate and also preferred embodiment seen in FIG. 5, a layer of filtering material 66 may be positioned between the collecting shell 54 and the growing medium 49 so that water that has passed through the growing medium 49 is filtered before being collected by the collecting shell 54. Any number of different filtering materials have been found to be effective in preventing debris from reaching the pump 18 and later on the spraying mechanism 20, including wood oak charcoal, folded paper, foam filters or combinations thereof. In this particular embodiment, filter 62 may or may not be required, depending on the degree of filtration desired.

While the present invention is described in connection with the tray 14 depicted in FIG. 3, it will be appreciated that it could be used with any tray which is supported by the watering bench above the watering compartment 16 and having a water collection and filtering features. In particular, in an alternative embodiment, seen in FIG. 5, the rectangular bottom 42 of the planting tray 14 is shown as being formed into the collecting shell 54 and identified with the reference numeral 42/54. This embodiment has the advantage of reducing the number of parts and thereby lowering the cost of the growing station 10.

Thus, it will be appreciated that the tray 14 is fully supported on the ledge 36 of bench 12 and is also slideably movable forwardly and rearwardly relative to the bench 12. Preferably, tray 14 is sized so that when it is in its forwardmost position relative to the back wall 30, it partially uncovers the pumping compartment 16, thereby affording partial access to the pump 18 or other devices therein, such as a float-valve pump control system within the pumping compartment 16. When full access to the pumping compartment 16 is desired, for example for maintenance service of the pump 18, tray 14 is opened the desired distance to access the pumping compartment 16. It is a significant aspect of the invention that the tray 14 remains supported by ledge 36 while in a partially open positions. If full, unrestricted access to the pumping compartment 16 is desired, tray 14 may be easily removed from the bench 12 using flange 52.

In assembly, bench 12 and tray 14 may be formed using several plastic polymer molding techniques, including blow molded, rotational molding or injection molding thus employing a manufacturing technique optimized for low cost, mass production. Insert molds for achieving different shaped ledges and arcuate angles may be useful as well as spin molding or foam molding techniques. Well known rotational molding procedures employ a mold cavity block and core formed from a metal or other suitable material, as is known to those skilled in the art. A mold cavity conforming to the external shape of the bench 12 and tray 14 that is to be molded is recessed in a mold cavity block. In operation, the mold is opened and a core conforming to the internal shape of the feeder that is to be molded is inserted into the mold cavity. After the mold has closed, dry polymer powder is introduced into the heated mold by means which are understood by those skilled in the art and the mold subjected to rotational motion so as to distribute the molten polymer throughout the mold areas. The thus molded bench 12 is allowed to cool in the mold for a period of time, usually by cooling with air. The cooled molded bench 12 and tray 14 are removed from the mold by opening the mold when the temperature of the molded bench 12 and tray 14 has been reduced below that at which distortion of the molded bench 12 and tray 14 may occur. Such temperature depends on the polymer composition used in the rotational molding of the bench 12 and tray 14, and will be understood by those skilled in the art.

A wide variety of polymers may be used in injection molding processes e.g. polyolefins, especially polyethylene, polypropylene and ethylene/vinyl acetate copolymers, polyesters and polyamides. As used herein, polyethylene refers to homopolymers of ethylene and copolymers of ethylene with minor amounts of at least one hydrocarbon alpha-olefin. In a preferred embodiment of the process of the present invention, the thermoplastic polymer injected into the mold is a polyolefin, especially a polyethylene. Wall thicknesses in the range 0.075 to 0.100 inches have been found to provide adequate support and functionality for both the bench 12 and tray 14.

The bench 12 and tray 14 may also be produced by low-pressure rotational molding in which the strength required from the mold is minimal. The rotational mold may therefore be constructed of thin metal or plastic, so that the tooling costs are only a small fraction (usually less than one-fifteenth) the cost of a conventional injection-mold. A further advantage in using rotational molding is that this low-pressure process produces parts which are relatively stress free, as compared to high-pressure injection molding processes. This advantage is particularly important since it enables the production of benches 12 and trays 14 of various configurations like those described herein having substantially stress-free walls, very high strength relative to weight and cost and very high resistance to internal and external forces applied radially as well as axially. For this purpose, a measured amount of plastic material to be used for producing the bench 12 or tray 14 is placed, in powder or liquid form, in the cavity of a rotational mold, having a cavity corresponding to the outer surface of the feeder to be produced, as described above, and the mold is closed. The mold is then placed into an oven where it is continuously rotated about both its vertical and horizontal axes as the mold is heated. The rotation of the mold causes the plastic material within it to come into intimate contact with all the surfaces of the mold cavity. The biaxial rotation continues until all the plastic material has been melted so as to completely cover the mold cavity and to form a uniform layer of melted plastic. While the biaxial rotation continues, the mold is moved out of the oven into a cooling chamber where air, or a mixture of air and water, cools the mold and the layer of molten plastic material within it until the bench 12 or tray 14 sufficiently hardens so as to retain its shape.

From the foregoing, it can be seen that there has been provided a growing station 10 having a slidably supported growing tray 14 on a watering bench, the tray 14 adapted for movement thereon to expose substantially the full area of a pumping compartment 16 located within the lowermost portion of the watering bench 12, the tray 14 remaining fully supported by bench 12, the tray 14 further adapted to filter and collect water that has been sprayed thereon and passed through the plants and growing medium contained therein.

While exemplary embodiments of the present invention have been shown and described, including preferred and alternate preferred embodiments, it will be obvious to those skilled in the art that changes and modifications may be made without departing from true spirit and scope of the invention. The matter set forth in the foregoing description and accompanying drawings is offered by way of illustration only and not as a limitation.

What is claimed is:

1. A growing station suitable for use in a hydroponic environment, the growing station comprising:

a watering bench having a closed lowermost portion;

a pumping compartment located within the lowermost portion of the watering bench; and, a growing tray suitable for containing plants and growing media therein, the tray slidably supported on the watering bench, the tray adapted for movement thereon to expose substantially the full area of a pumping compartment, the tray remaining fully supported by the bench, wherein the tray is adapted to filter and collect water that has been sprayed thereon and passed through the plants and growing media contained therein.

2. The growing station of claim 1, wherein the tray comprises a flat, rectangular bottom integral at the opposite side edges thereof with upstanding side walls, an upstanding rear wall, and an upstanding front wall so as to accommodate a variety of seeds or plants embedded in a growing medium contained within said tray.

3. The growing station of claim 2, wherein said bottom is formed as a collecting shell whereby to collect water that has passed through the tray.

4. The growing station of claim 3, wherein said open water passage port is located in the central portion and is connected by a tube to a water filter so that filtered water is delivered into the pumping compartment.

5. The growing station of claim 2, wherein the tray further comprises a water collecting shell coextensive with and adjacent to the bottom of the tray.

6. The growing station of claim 5, wherein said collecting shell has a central portion sloping downward from its outermost edges to facilitate collection of water.

7. The growing station of claim 1, further including a submersible pump disposed in the pumping compartment and adapted to pump water from the growing station.

8. The growing station of claim 7, wherein a port is formed in the lowermost portion of the bench, the pump being adapted to pump water from the growing station through said port.

9. The growing station of claim 7, wherein a port is formed in the growing tray, the pump being adapted to pump water from the growing station through said port.

10. The growing station of claim 2, wherein the tray is sized so that when it is in a forwardmost position relative to the back wall, tray remains supported by the ledge, thereby affording partial access to the pumping compartment.

11. The growing station of claim 2, wherein the front, rear and side walls are integral at the upper edges thereof with a outwardly projecting flange so as to facilitate removal from the watering bench.

12. The growing station of claim 3, wherein the collecting shell is shaped with a central portion sloping downwardly from its outermost edges and intersecting an open water passage port located in the central portion so as to facilitate collection of water that has passed through the growing tray.

13. The growing station of claim 3, wherein the tray further comprises a layer of filtering material positioned above the collecting shell so that water is filtered before being collected by the collecting shell.

14. The growing station of claim 5, wherein the tray further comprises a layer of filtering material positioned above the collecting shell so that water is filtered before being collected by the collecting shell.

15. The growing station of claim 5, wherein said water collecting shell is removable from the tray.

16. The growing station of claim 1, wherein said watering bench comprises a pair of opposing upstanding side walls, an upstanding rear wall therebetween, and an upstanding front wall located opposite the rear wall and integral with the side wall, the uppermost portions of back wall and side walls being offset outwardly from the lowermost portions of back wall and side walls near the middle height of the back wall and side walls at a position equal to the height of the uppermost edge of the front wall so as to provide rectangular support ledges suitable for supporting tray in a horizontal position above the pumping compartment.

\* \* \* \* \*